United States Patent
Wakabayashi et al.

(10) Patent No.: US 6,463,900 B1
(45) Date of Patent: Oct. 15, 2002

(54) ENGINE IDLING STOP APPARATUS, SYSTEM THEREOF AND SIGNAL DISPLAY APPARATUS USED IN THE SYSTEM

(75) Inventors: Katsushi Wakabayashi, Tokyo; Koji Korematsu, Inagi, both of (JP)

(73) Assignee: Transportation System & Electric Co., Ltd., Tokyo (JP)

( * ) Notice: Subject to any disclaimer, the term of this patent is extended or adjusted under 35 U.S.C. 154(b) by 142 days.

(21) Appl. No.: 09/635,126

(22) Filed: Aug. 8, 2000

(30) Foreign Application Priority Data

Aug. 11, 1999 (JP) .......... 11-227414
Nov. 2, 1999 (JP) .......... 11-312380

(51) Int. Cl.[7] ............................................. G06G 7/76
(52) U.S. Cl. ............... 123/179.4; 340/929; 701/117
(58) Field of Search ................. 701/117; 340/929; 123/179.2, 179.3, 179.4

(56) References Cited

U.S. PATENT DOCUMENTS

| | | | | |
|---|---|---|---|---|
| 4,006,723 A | * | 2/1977 | Schmidli | 123/179.4 |
| 4,200,860 A | * | 4/1980 | Fritzinger | 340/43 |
| 4,402,286 A | * | 9/1983 | Pagel et al. | 123/179.4 |
| 4,485,772 A | * | 12/1984 | Uchida et al. | 123/179.4 |
| 4,827,258 A | * | 5/1989 | Evans | 340/929 |
| 4,847,618 A | * | 7/1989 | Baustin | 340/929 |
| 5,940,010 A | * | 8/1999 | Sasaki et al. | 340/929 |
| 2001/0018903 A1 | * | 9/2001 | Hirose et al. | 123/179.4 |

FOREIGN PATENT DOCUMENTS

| | | |
|---|---|---|
| DE | 24 50 149 | 9/1975 |
| DE | 30 19 709 | 12/1981 |
| DE | 40 38 013 | 6/1992 |
| DE | 196 21 494 | 10/1997 |
| JP | 11062650 | 3/1999 |

* cited by examiner

Primary Examiner—Erick Solis
(74) Attorney, Agent, or Firm—Venable; Robert J. Frank; Jeffrey W. Gluck

(57) ABSTRACT

This invention provides an apparatus for stopping the idling of an automobile engine, a system for relating the apparatus to a traffic signal device and further a signal display apparatus for supplying a driver information such as idling stop of the automobile engine and the like in relation to the system in order to prevent generation of exhaust gases caused by unnecessary engine idling when an automobile is stopped at a traffic signal and the like. A period of time $t_S$ corresponding to the period of time until the traffic signal of a traffic signal device is changed to green is calculated based on a signal received from by the traffic signal device. A period of time T, which serves as a base for determining whether idling is to be stopped or not, is determined based on the calculated period of time $t_S$. The idling of the automobile engine is stopped only when the period of time T satisfies a predetermined condition. When the idling of the automobile engine is stopped, the engine is restarted after the period of time T.

9 Claims, 13 Drawing Sheets

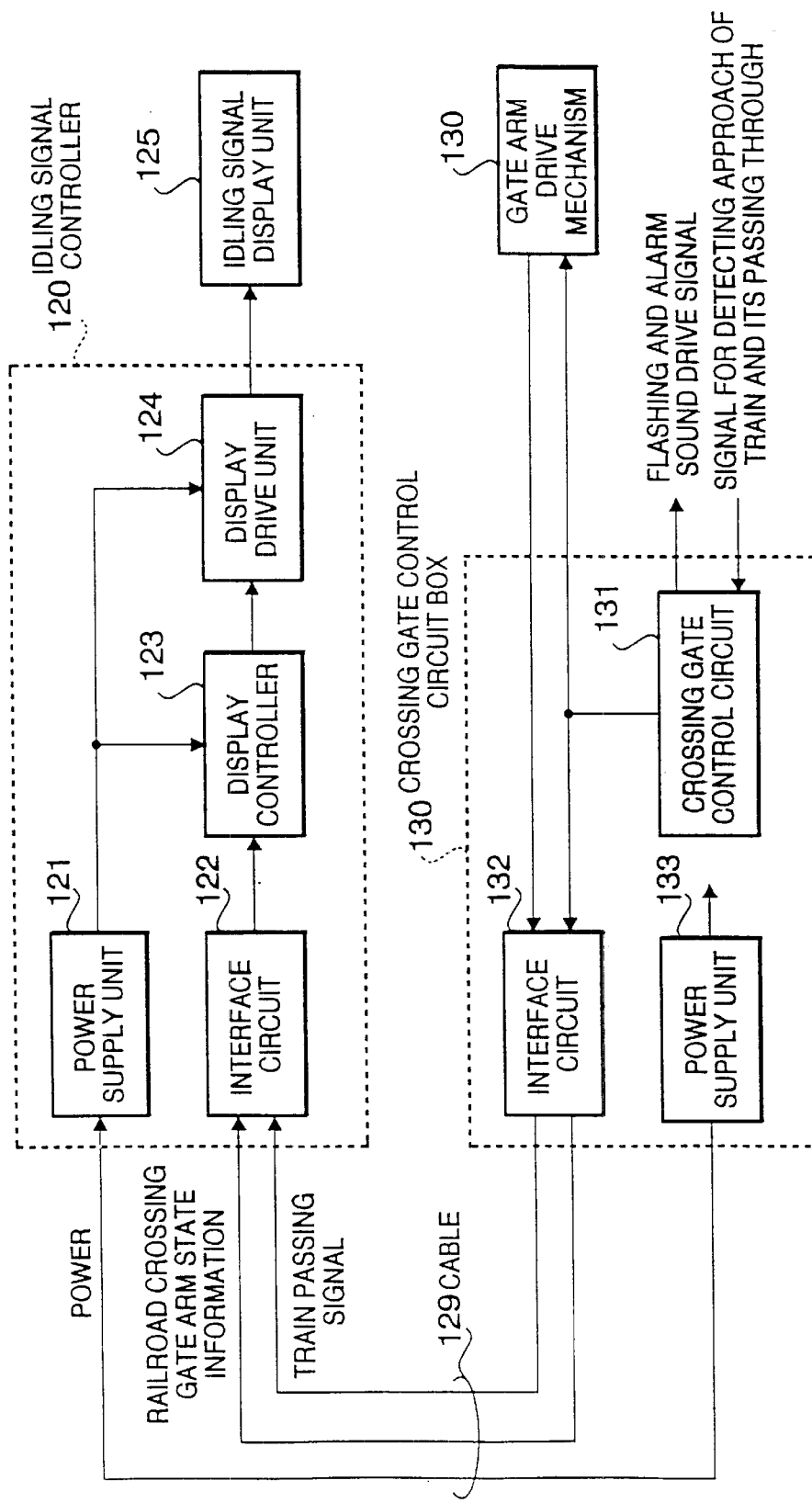

ENGINE IDLING STOP APPARATUS, SYSTEM THEREOF AND SIGNAL DISPLAY APPARATUS USED IN THE SYSTEM

BACKGROUND OF THE INVENTION

1. Field of the Invention

This invention relates to an automobile engine idling stop apparatus for stopping engine idling of an automobile when an automobile stops at an intersection or the like, a system thereof and a signal display apparatus used for displaying an indication related to idling stop.

More specifically, this invention relates to an automobile engine idling stop apparatus for automatically stopping the idling of an automobile engine when an automobile temporarily stops at an intersection or the like to wait for a traffic signal lamp to change, a system thereof and a signal display apparatus used in the system, wherein the signal display apparatus is connected to a traffic signal device for stopping the automobile on the road, a railroad crossing gate and the like so as to be operated in association therewith to prompt a driver to stop engine idling.

2. Description of the Related Art

When automobiles wait for a traffic signal to change to red for a predetermined period of time, ordinarily, the drivers wait for the change of the traffic signal while keeping engines in an idling state in most cases. By continuing the engine idling, not only the fuel supplied thereto during the idling time is wastefully consumed but also global warming substances such as carbon dioxide ($CO_2$) and the like and gases such as nitrogen oxide (NOx) and the like which are harmful to human bodies are discharged. To cope with this problem, an "idling stop campaign" is being conducted in some districts to promote the idling stop of automobile engines when automobiles are at rest.

Apparatus for controlling the stop of automobile engines have been proposed. The engine stop control apparatus are arranged for temporary stop of the automobile engines when the automobile stops at a red signal or meets a traffic jam. These apparatuses are proposed in the technologies disclosed in, for example, Japanese Unexamined Patent Publication No. 11-62650.

According to the technology disclosed in Japanese Unexamined Patent Publication No. 11-62650, any one of a normal cruising mode or an idling stop/energy saving cruising mode is previously selected by a mode selection switch. In the case that the idling stop/energy saving cruising mode is selected, it is possible to stop an engine at temporary stoppage of an automobile and then to restart the engine, by the ordinary driving operation such as the depression of a brake pedal and the shift operation of a shift lever. By this operation, an idling-stop-controlled automobile can be realized, whereby fuel consumption is saved and atmospheric pollution is prevented in a global scale.

When a driver waits for signal change from red to green or a driver waits for train passing at a lowered gate of a railroad crossing, the driver usually keeps the engine in an idling state without stopping. The reason is to promptly start an automobile just after the red signal is changed to green or gate arm is lifted after train passing. However, gasoline is wastefully consumed by keeping the engine in the idling state during the automobile stoppage.

In addition to the above, the engine discharges global warming substances such as carbon dioxide ($CO_2$) and the like and gases such as nitrogen oxide (NOx) and the like which are harmful to human bodies. Therefore, an "idling stop campaign" is being conducted in some districts to promote the idling stop when an automobile is at rest as described above. However, a major reason why the "idling stop campaign" does not become widespread resides in the nuisance of stopping an engine.

FIG. 13 shows a discharge characteristics of an amount of nitride oxide (NOx) before and after stopping an engine idling. In the figure, "i" shows a NOx discharge level in idling state. Numeral $t_1$ denotes a time at which idling is stopped and numeral $t_2$ denotes a time at which an engine is restarted. A slanting-lined region $M_1$ shows an amount of exhaust gas which is reduced by an idling stop. A slanting-lined region $M_2$ shows an excess amount of exhaust gas which is increased by highly concentrated exhaust gas at engine restart, in comparison with the continuous idling.

Thus, no NOx gas is discharged for a period of time t by stopping the idling, and the amount of exhaust gas reaches a peak value which exceeds the level of the idling start by restart of the engine and then it is lowered to the level of the idling state as a time passes. In the case that the region $M_2$ is smaller than the region $M_1$, the idling stop is effective to reduce the exhaust gas. Note that curves showing variations of the exhaust gases, which are similar to that of NOx, are also drawn similarly as to $CO_2$, CO and THC.

However, there are cases in which it is not always preferable to stop idling when an automobile is stopped at a stop signal (red signal) and the like, for example, as shown below.

(1) When an engine is restarted, the amount of fuel required in a cranking process (a process for restarting the engine by rotating a starter motor) is more than the amount of fuel needed in continuous idling. In this case, fuel is much consumed by the idling stop.

(2) When an engine is restarted, harmful exhaust gas are discharged more than that of the exhaust gases discharged in continuous idling. In this case, the harmful exhaust gas are discharged more than that in the idling stop.

(3) A battery load is excessively increased when the head lamps are turned on at night or air conditioning is carried out. In this case, there may be a possibility that the battery goes dead and an engine cannot be restarted.

In the above cases, harmful effects are caused by the stop of idling.

As a reason why "the idling stop" is not widely popularized even though a driver recognizes the effect of it, there is the conventional custom that the driver cannot instantaneously recall the idling stop and misses a timing for the action, in addition to the driver's bothersome feeling of the idling stop action.

Further, still another reason is that the driver may find it unpleasant to have to promptly run an automobile by restarting the engine idling just before signal changes from red to green or just before a crossing gate is lifted.

SUMMARY OF THE INVENTION

To solve the above problems, an object of the invention is to provide an automobile engine idling stop apparatus and a system thereof capable of reducing the wasteful consumption of fuel and the discharge of harmful exhaust gases by stopping idling as well as capable of restarting the engine without giving feelings of anxiety to a driver.

It is another object of the present invention to provide an idling stop signal display apparatus as an apparatus effective to make an "idling stop" campaign to become widespread, the apparatus being arranged such that it prompts a driver to stop an engine at a proper timing while a traffic signal device displays a red signal or while the gate arm of a crossing gate is lowered and then notifies the driver of a time at which the engine is to be restarted.

[Means A, to Solve the Theme]

To achieve the above objects, according to a first aspect of the invention, there is provided an automobile engine idling stop apparatus which comprises receiver means for receiving a signal transmitted from a roadside apparatus and indicating a period of time until a traffic signal changes from a present time; detection means for detecting the state of an automobile including the running condition thereof; and control means for controlling idling stop based on the signal received from the receiver means and the state of the automobile detected by the detection means.

According to the first aspect of the invention, the receiver means receives the signal which is transmitted from the roadside apparatus (for example, a traffic controller such as a traffic signal device, a beacon for detecting traffic jam, or the like) and indicates the period of time until the traffic signal changes from the present time (for example, a period of time from a time at which the automobile is stopped by a red traffic signal or a traffic jam to a time at which the automobile is to begin running).

The detection means detects the state of the automobile including the running condition thereof, for example, a running speed of the automobile, operating status of a foot brake and a parking brake at stoppage, running condition of the automobile such as the head lamps direction indicators, and an air conditioner, or the like. The control means controls the idling stop of the automobile engine based on the signal received from the receiver means and the states of the automobile detected by the detection means. Therefore, in the case that a large load is imposed on a battery which is necessary to restart the automobile engine, it is possible to continue the idling without stopping it.

Further, the control means calculates an idling stop period of time based on the received signal and the state of the automobile, and the engine idling is controlled depending upon whether or not an idling stop effect can be obtained from the calculated idling stop period of time. For example, when the calculated idling stop period of time is not sufficient to obtain the idling stop effect, the idling is continued.

Accordingly, the wasteful consumption of fuel and the discharge of harmful exhaust gases can be reduced by stopping the idling and restarting the engine.

In a second aspect of the invention, the frequency of the signal of the first aspect of the invention may be made to a first frequency when the traffic signal of a traffic signal device is changed to a stop signal (red) and made to a second frequency when the stop signal (red) is changed to the go signal (green) and the frequency of the signal may be continuously shifted from the first frequency with passage of time of the stop signal (red) continues.

According to the second aspect of the invention, the receiver means of the first aspect of the invention may receive the signal whose frequency may be made to the first frequency when the traffic signal of the traffic signal device is changed to the stop signal (red) and may be made to the second frequency when the stop signal is changed to the go signal (green) and may be continuously changed (for example, linearly changed) from the first frequency to the second frequency with passage of time of the stop signal (red). By receiving the above signal, a period of time, i.e. from the time at which the stop signal is received to the time at which the stop signal is changed to a go signal (green) can be calculated. Based on the above calculated result, the control means can control the idling state of the automobile engine, that is, to keep the engine idle or to stop/restart engine idling, as to reduce wasteful fuel consumption and harmful exhaust gases.

In a third aspect of the invention, the control means of the first or second aspect of the invention may stop idling in the case that a reduced amount of fuel by the idling stop exceeds an excess amount of fuel which is consumed by the engine restart.

According to the third aspect of the invention, since the control means of the first or second aspect of the invention may stop the idling in the case that the reduced amount of fuel by the idling stop exceeds the excess amount of fuel which is consumed by the engine restart, that is, in the case that the idling stop effect can be obtained, the amount of fuel consumption can be reduced.

And, the engine idling is kept continuously when the excess amount of fuel which is consumed by the engine restart exceeds the reduced amount of fuel by the idling stop. In this case, the excess consumption of fuel can be prevented by the continuous idling of the automobile engine.

In a fourth aspect of the Invention, the control means of any of the first to third aspects of the invention may stop the idling in the case that a reduced amount of harmful exhaust gases by the idling stop exceeds an excess amount of harmful exhaust gases by the engine restart.

According to the fourth aspect of the invention, since the control means in any one of the first to third aspects of the invention may stop the idling in the case that the reduced amount of harmful exhaust gases by the idling stop exceeds the excess amount of harmful exhaust gases by the engine restart, that is, in the case that the idling stop effect can be obtained, the harmful exhaust gases discharged by the idling can be reduced.

And, the idling is continued when the excess amount of harmful exhaust gases by the engine restart exceeds the reduced amount of harmful exhaust gases by the idling stop. In this case, the discharge of the harmful exhaust gases at the engine restart can be prevented by keeping the engine idling without interruption.

In a fifth aspect of the invention, the control means in any one of the first to fourth aspects of the invention may restart the automobile engine before a predetermined period of time when the traffic signal lamp of the traffic signal change to green.

According to the fifth aspect of the invention, since the control means of any one of the first to fourth aspects of the invention may restart the automobile engine before a predetermined period of time when the traffic signal of the traffic device is changed to green. The automobile can be started as soon as the traffic signal of the traffic signal device changes to green. Thus, the engine can be restarted without giving any anxiety to a driver.

In a sixth aspect of the invention, the control means of any of the first to fifth aspects of the invention may continue the idling of the engine when the state of the automobile detected by the detection means is such that electrical components including at least lamps and an air conditioner are in use.

According to the sixth aspect of the invention, the control means of any of the first to fifth aspects of the invention may continue the idling of the engine when the state of the automobile detected by the detection means is such that the electrical components including at least the lamps (for example, head lamps, auxiliary head lamps or the like) and the air conditioner are in use. Thus, when a large load is imposed on the battery which is kept idling continuously in order to prevent burning out the battery capacity and to be able to restart the engine.

In a seventh aspect of the invention, an automobile engine idling stop system includes the automobile engine idling stop apparatus of any one of the first to sixth aspects of the inventions and a transmitter means disposed on the part of a road for transmitting a signal indicating a period of time until a traffic signal changes from a present time to green.

According to the seventh aspect of the invention, the transmitter means disposed on the part of the road (for example, the traffic signal device or the traffic controller such as the beacon or the like for detecting traffic jam) transmits a signal indicating the period of time until the traffic signal changes from the present time to green (for example, the period of time from the time at which the automobile is stopped by the red traffic signal or the traffic jam to the time at which the automobile can be started). Since the signal may be received by the receiver means in the automobile engine idling stop apparatus in any one of the first to sixth aspects of the invention, the idling stop may be controlled or the engine may be restarted based on the signal as described above.

In an eighth aspect of the invention, the transmitter means of the seventh aspect of the invention may be mounted in conjunction with the traffic signal device.

According to the eighth aspect of the invention, since the transmitter means in the seventh aspect of the invention may be mounted in conjunction with the traffic signal device, it may transmit a signal indicating a period of time until the traffic signal lamp of the traffic signal device is changed from a stop signal (red signal) to a go signal (a green signal or an arrow signal). Thus, the control means may control the engine idling depending upon whether or not the idling stop effect can be obtained during the period of time indicated by the transmitted signal. That is, the wasteful consumption of fuel and the discharge of harmful exhaust gases can be reduced by stopping the idling and restarting the engine without any detrimental effects caused by the idling stop as well as the engine can be restarted without giving any anxiety to the driver.

[Means B, to Solve the Theme]

To solve the above problems, there is provided an idling stop signal display apparatus connected to traffic relating equipment for prompting a walker or a traveling automobile to stop comprising display means capable of making a display for prompting an automobile at rest at least to stop an engine and to restart the stopped engine; and control means having a function for determining a time zone during which it is preferable to stop the engine based on the signal input from the traffic relating equipment and causing the display means to make a display for prompting the engine to stop as well as a function for determining a time zone during which it is preferable to restart the stopped engine and causing the display means to make a display for prompting the engine to restart.

Then, the traffic relating equipment may be a traffic signal device installed at an intersection or the like and connected thereto and the control means divides the time zone during which a red signal is turned on for a predetermined period of time at predetermined intervals in a time series direction based on input red signal display information, and has a function for causing the display means to make a display for prompting the engine to stop in the first divided section of a plurality of divided sections and a function for causing the display means to make a display for prompting the engine to restart in the final section of the plurality of divided sections.

Specifically, in the case that the length of an preceding red signal exceeds a predetermined period of time, the control means may control the display means such that the display means sequentially makes a first display for prompting the engine to stop, a second display for prompting the engine to leave as it is which follows the first display and a third display for prompting to restart the engine which follows the second display, whereas when the length of the information of the immediately preceding red signal does not exceed the predetermined period of time, the control means may control the display means such that the display means make only the second display.

Further, the traffic relating equipment may be a crossing gate of a railroad and connected thereto and the control means may cause the display means to make a display for prompting the engine to stop of the automobile based on a signal input to the apparatus which indicates that a train has approached or a crossing arm has been lowered and to make a display for prompting the engine to restart based on an input signal to the apparatus which indicates that the train has passed.

BRIEF DESCRIPTION OF THE DRAWINGS

FIG. 9 is a schematic view showing timings at which the turning-on of the traffic signal lamps of the traffic signal device correspond to idling at the intersection and the like.

FIG. 20 is a system diagram explaining the functions of the respective units of a modification of the apparatus shown in FIG. 11.

DESCRIPTION OF THE PREFERRED EMBODIMENTS

Implementation Form of the Invention: A

First, an example of an embodiment of an apparatus and a system of the present invention will be described below in detail with reference to the accompanying drawings. Note that the embodiment is arranged such that the idling of an automobile engine is stopped and the automobile engine is restarted in response to a command transmitted from a traffic signal device.

Figure 1:
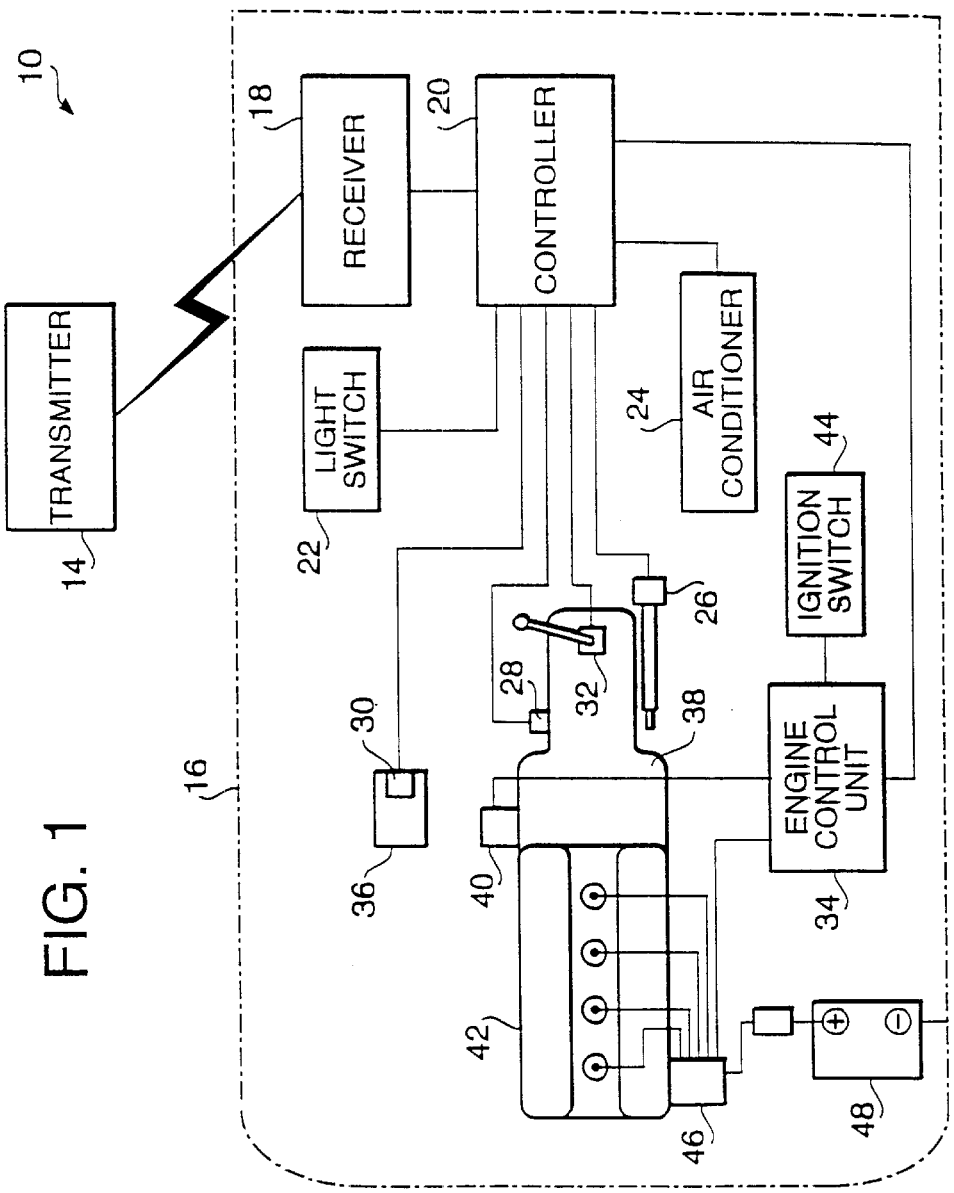
FIG. 1 is a view showing the schematic arrangement of an automobile engine idling stop system according to an embodiment of the present invention.
Figure 2:
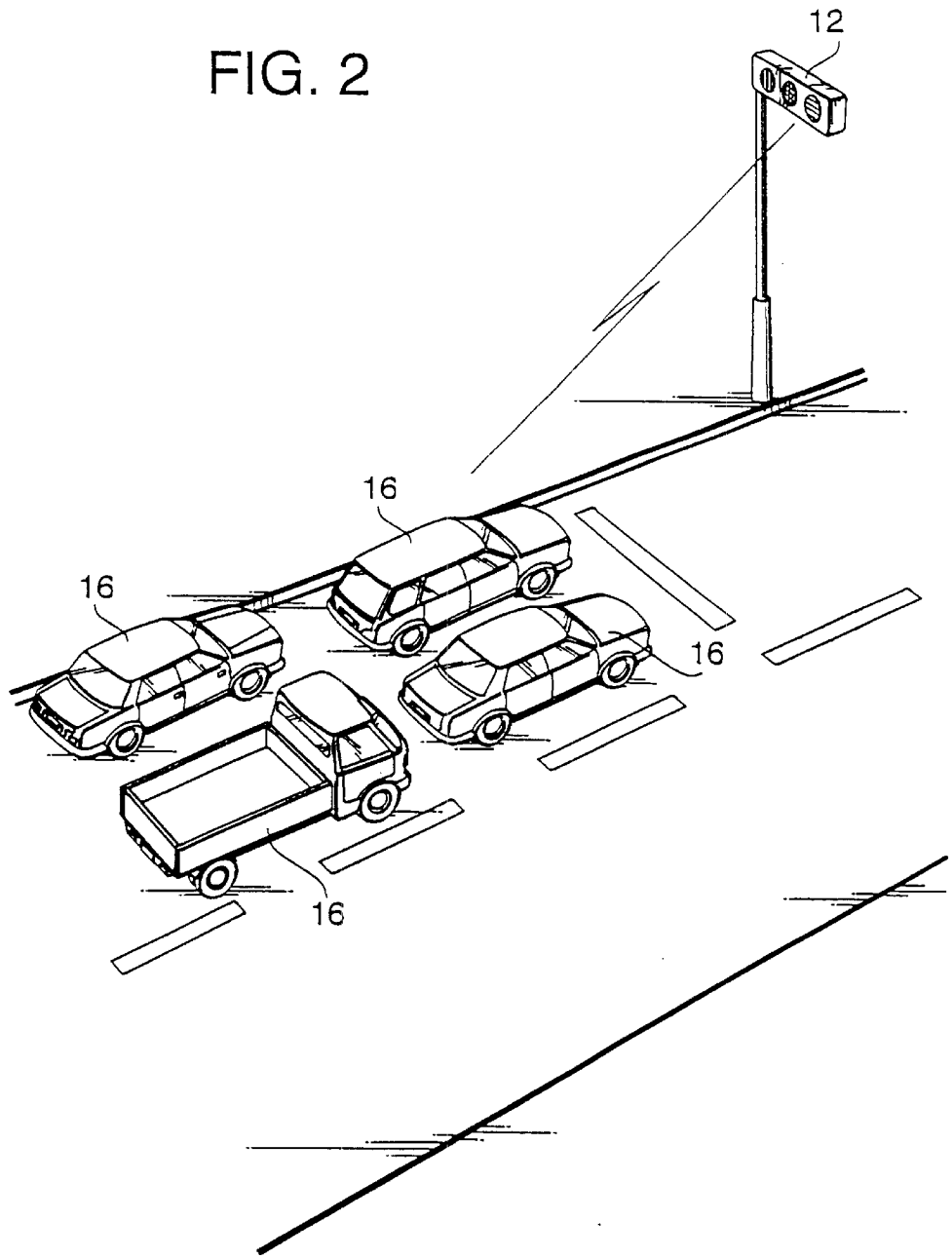
FIG. 2 is a view showing an example of the automobile engine idling stop system according to the embodiment of the present invention.

FIG. 1 is a view showing the schematic arrangement of an automobile engine idling stop system 10 according to the present invention. As shown in the figure, the automobile engine idling stop system 10 is arranged such that the command transmitted from a transmitter 14 disposed to a traffic signal device 12 (refer to FIG. 2) is received by a receiver 18 provided with an automobile 16 and the received command is supplied to a controller 20 which stops the idling of an automobile engine and restarts the engine. In order to detect the state of the automobile 16, the controller 20 is connected to a light switch 22, an air conditioner 24, a parking brake switch 26, a foot brake switch 30, an automobile speed sensor 28, a neutral position detecting switch 32 and an engine control unit 34, determines the state of the automobile based on the signals supplied from the respective units and controls the engine control unit 34, thereby stopping the idling of the automobile engine and restarting the engine.

The light switch 22 connected to the controller 20 turns on not shown head lamps and rear combination lamps as well as supplies a signal indicating that the head lamps and the rear combination lamps have been turned on, that is, the switched state (ON/OFF state) thereof, to the controller 20.

The air conditioner 24 regulates room temperature of the automobile 16 as well as supplies a signal indicating the operating condition (ON/OFF state) of the air conditioner 24 to the controller 20.

The parking brake switch 26 is mounted on a parking brake lever, detects the operating condition of the parking brake and supplies the detected signal to a meter panel so as to notify a driver of the present condition of the parking brake and supplies the signal to the controller.

The foot brake switch 30 is mounted on a foot brake 36 and turned ON when the foot brake 36 is actuated, turns on the rear combination lamps to thereby notify how the foot brake is used to a following automobile, and supplies a signal indicating the operating condition of the foot brake to the controller 20.

The automobile speed sensor 28 is mounted on a transmission 38 of the drive system of the automobile 16 and detects an automobile speed from the rotational speed of the rotational shaft of the transmission 38. Then, the automobile speed sensor 28 supplies the detected automobile speed to the meter panel (speed meter) as a signal so that a traveling speed is notified to the driver and supplies the detected automobile speed to the controller 20.

The automobile speed sensor 28 is mounted on a transmission 38 as the drive system of the automobile 16 and detects an automobile speed from the rotational speed of the rotational shaft of the transmission 38. Then, the automobile speed sensor 28 supplies the detected automobile speed to the meter panel (speed meter) as a signal so that a traveling speed is notified to the driver and supplies the detected automobile speed to the controller 20.

The neutral position detecting switch 32 is disposed in the vicinity of a shift lever for shifting the transmission 38, detects a neutral position and supplies a signal representing the result of detection to the controller 20.

The controller 20 detects the state of the automobile (traveling and stopping state, a load imposed on a battery 48, and the like) based on the signals output from the light switch 22, the air conditioner 24, the parking brake switch 26, the foot brake switch 30, the automobile speed sensor 28 and the neutral position detecting switch 32, respectively.

Further, a starter motor 40 for starting an engine 42, an ignition switch 44 for starting the engine by rotating the starter motor 40, an igniter for igniting the engine and a distributor 46 as well as the controller 20 are connected to the engine control unit 34. The engine control unit 34 starts and stops the engine 42 under the control of the controller 20. Ordinarily, the driver starts and stops the engine 42 by actuating the ignition switch 44.

Further, electric power to the electrical components mounted on the automobile 16 is supplied from the battery 48 mounted on an engine room. The power is supplied in such a manner that the negative terminal of the battery 48 is grounded to an automobile body and the positive terminal thereof is connected to the respective electrical components which are grounded to the automobile body.

Next, the signal transmitted from the transmitter 14 disposed to the traffic signal device 12 will be described.

The traffic signal lamp driven by the traffic signal device 12 is sequentially changed to red, green and yellow in an optional period of time set respectively. Further, the period of time may be fixed or may be changed externally according to the state of traffic jam or the like.

Figure 3:
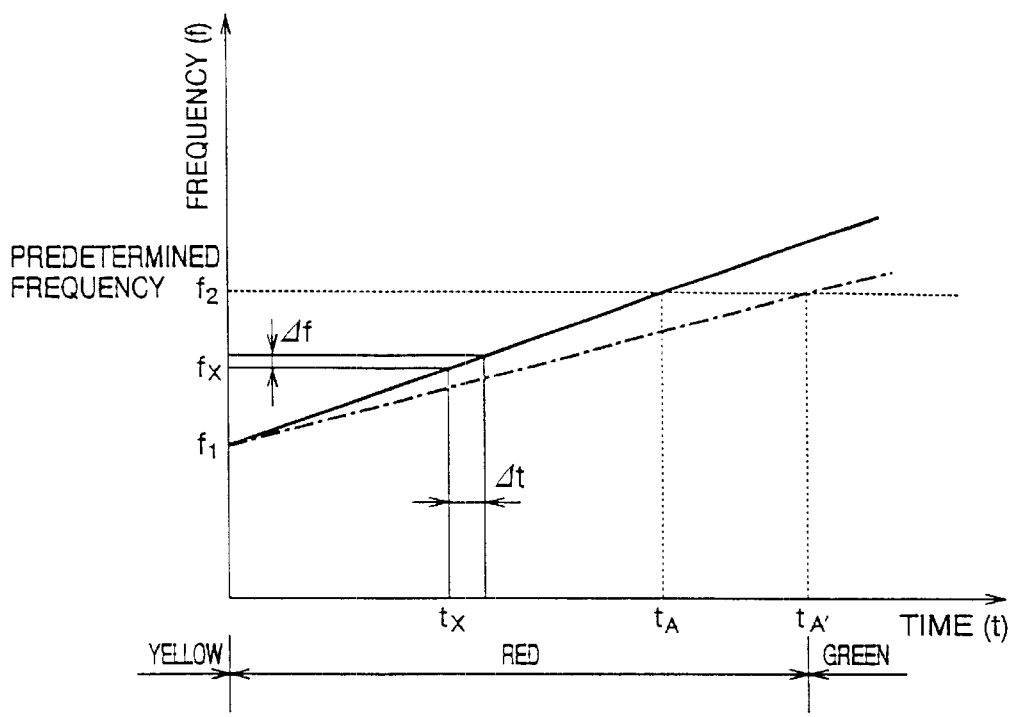
FIG. 3 is a view explaining an example of a signal transmitted by a transmitter.

The transmitter 14 of the traffic signal device 12 transmits a frequency-modulated signal from the time when the traffic signal changes to red to the time when it changes to green. The signal frequency is modulated such that a signal of the predetermined frequency is $f_1$ when the traffic signal lamp changes to red and then the signal frequency is modulated to a higher frequency as a time passes so that it reaches a predetermined frequency $f_2$ at a time $t_A$ when the traffic signal changes to green as shown in FIG. 3. That is, the time-frequency characteristic of the output signal is represented by a straight line. Note that when the period of time for changing the traffic signal lamp of the traffic signal device 12 is changed, the inclination of the straight line of the time-frequency characteristic is changed so that the predetermined frequency $f_2$ is obtained at a time $t_A'$ when the traffic signal lamp is changed to green. As a result, a signal, which is modulated to satisfy the dot-dash-line shown in FIG. 3, is obtained. Further, in the above description, when the traffic signal lamp of the traffic signal device 12 is changed to red, the frequency of the signal is modulated to a higher frequency as a time passes. However, the frequency thereof may be modulated to a lower frequency as a time passes.

Next, it will be described how the controller 20 stops the idling of the automobile engine and the restarts it based on the signal transmitted from the transmitter 14.

In general, automobile engines have different engine characteristics (characteristics of fuel consumption, exhaust gases or the like) depending upon the types and specifications of the engines. That is, a period of time (idling stop effective period of time), which is required to obtain the idling stop effect (reduction in wasteful fuel consumption and harmful exhaust gases), is not constant depending upon the respective engines. Therefore, the controller 20 determines whether idling is to be stopped or not depending upon the idling stop effective period of time of each engine, and controls the idling stop and the engine restart.

When the period of time $t_s$ until restart of the engine satisfies the condition to be described below, the controller 20 judges the idling stop effective and stops idling of the automobile engine.

Figure 5:
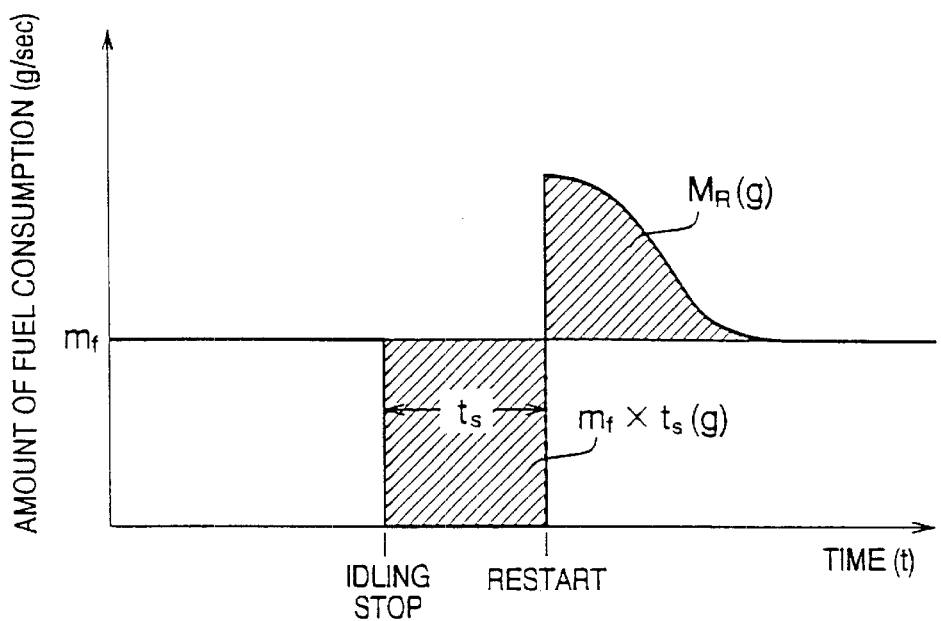
FIG. 5 is a graph explaining conditions under which an idling stop effect can be obtained in the consumption of fuel.

When the engine is restarted, an amount of fuel consumption is increased by $M_R(g)$ as shown in FIG. 5. In contrast, an amount of fuel which can be saved by stopping idling during the period of time $t_s$ can be represented by $m_f \times t_s(g)$, where an amount of fuel consumed in continuous idling during $t_s$ is represented by $m_f (g/s)$. Accordingly, the idling stop effect can be obtained when the condition $m_f \times t_s > M_R$ is satisfied, i.e., the condition $t_s > M_R/m_f$ is satisfied.

Figure 6:
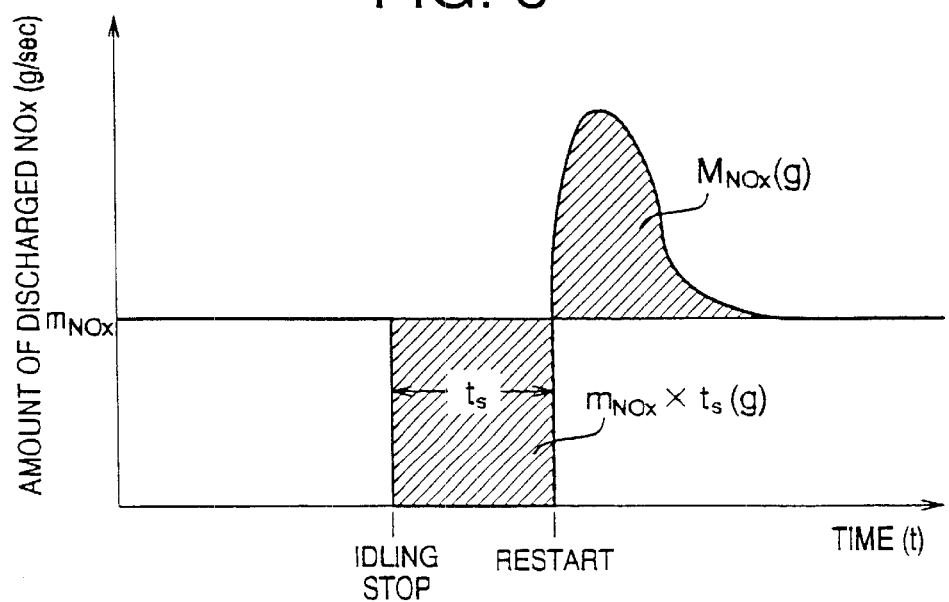
FIG. 6 is a graph explaining conditions under which an idling stop effect can be obtained in exhaust gases (NOx).

Further, when the engine 42 is restarted, an amount of nitride oxide (NOx) discharged from the engine 42 is also increased by $M_{NOx}$ (g) as shown in FIG. 6. An amount of discharged NOx which can be reduced by stop idling during the period of time $t_s$ is represented by $m_{NOx} \times t_s$, where an amount of NOx discharged in continuous idling during $t_s$ is represented by $m_{NOx}$ (g/s). Accordingly, the idling stop effect can be obtained when the condition $m_{NOx} \times t_s > M_{NOx}$ is satisfied, that is, the condition $t_s > M_{NOx}/m_{NOx}$ is satisfied.

Further, the hydrocarbons (HC) discharged from the engine 42 is also increased by the restart of the engine 42 likewise the NOx, and the idling stop effect can be obtained when the condition $t_s > M_{HC}/M_{HC}$ is obtained, where an amount of HC discharged is represented by $m_{HC}$ (g/s) and an amount HC increased when the engine 42 is restarted is represented by $M_{HC}$ (g).

Figure 4:
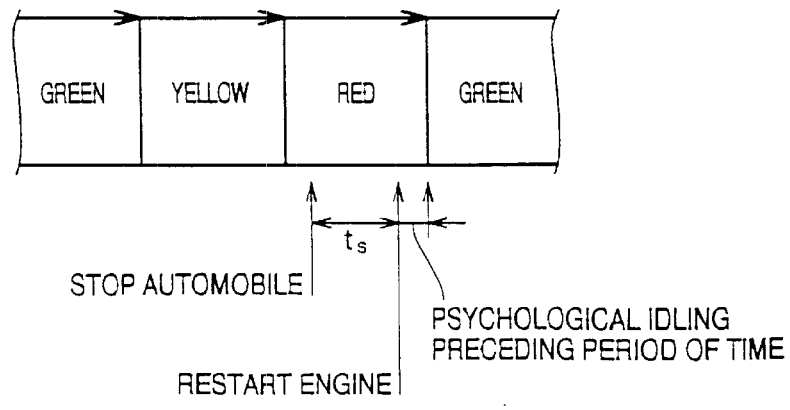
FIG. 4 is a view showing a timing at which an automobile engine is restarted after the idling thereof is stopped.

Next, an algorithm for calculating the period of time $t_s$ will be described with reference to FIG. 3, the period of time $t_s$ being from the time at which the automobile 16 reaches a particular region such as an intersection or the like and stops there to the time at which the engine 42 is to be restarted as shown in FIG. 4. The period of time $t_s$ is important as a base of the criteria time T for judgment.

The controller 20 obtains the signal transmitted from the transmitter 14 of the traffic signal device 12 through the receiver 18, and calculates the period of time until the traffic signal of the traffic signal device 12 changes to green as described later.

When the time at which the signal transmitted from the transmitter 14 is represented by a time $t_X$, and the frequency of the signal at the time is represented by $f_X$ and an amount of change of the frequency after a period of time $\Delta t$ passes from the time $t_X$ is represented by $\Delta f$, the inclination of the straight line of the time-frequency characteristic of the signal transmitted from the transmitter 14 is made to $\Delta f / \Delta t$. Therefore, the straight line can be represented by the following formula.

$$f = \Delta f / \Delta t \times t + f_1 \qquad (1)$$

$f_1$ is represented by the time $t_X$ at which the signal transmitted from the transmitter 14 is received and a frequency $f_X$ at the time, therefore, the formula (1) can be represented by the following formula.

$$f = \Delta f / \Delta t \times t + f_X - \Delta f / \Delta t \times t_X \qquad (2)$$

The period of time $t_S$ until the traffic signal changes to green is a value obtained by subtracting the time $t_X$ at which the signal is received and a time $\Delta t + \alpha (\alpha:$ coefficient of calculation time) necessary to the calculation from the time $t_A$ at which the traffic signal lamp is changed to green.

$$t_S = t_A - (t_X + \Delta t + \alpha) \qquad (3)$$

When $t_A$ is represented by the time $t_X$ at which the signal transmitted from the transmitter 14 is received and the frequency $f_X$ at the time, the formula (3) can be represented by the following formula.

$$t_S = (f_2 - f_X) \times \Delta t / \Delta f_A - (\Delta t + \alpha) \qquad (4)$$

Note that the time $\Delta t + \alpha$ necessary to the calculation can be ignored because it is a minute period of time.

Therefore, if the frequency $f_2$ of the modulated signal at which the traffic signal changes to green is settled in advance, the period of time $t_S$ until the traffic signal change can be calculated from relation between the frequency $f_X$ of the received signal and the frequency deviation $\Delta f$ during the time deviation $\Delta t$ of the received signal.

And, by determining in advance the frequency $f_2$ at which the traffic signal changes to green, the time period of time $t_S$ until the traffic signal is changed can be calculated even if the period of time until the traffic signal changes to green is variable (the time $t_A$ at which the traffic signal is changed to green is not constant). Note that $f_1$ may be or may not be predetermined.

After the period of time $t_S$ until the traffic signal lamp is change d is calculated, the controller 20 judges whether the idling is to be stopped or not based on the above condition. Note that the time $t_S$ is not the time when the traffic signal changes actually to green as shown in FIG. 4. It is preferable that the engine is restarted prior to the change of the traffic signal by providing the psychological idling preceding period of time. The psychological idling preceding period of time permits the engine 42 to be smoothly restarted without giving any anxiety to the driver.

Figure 7:
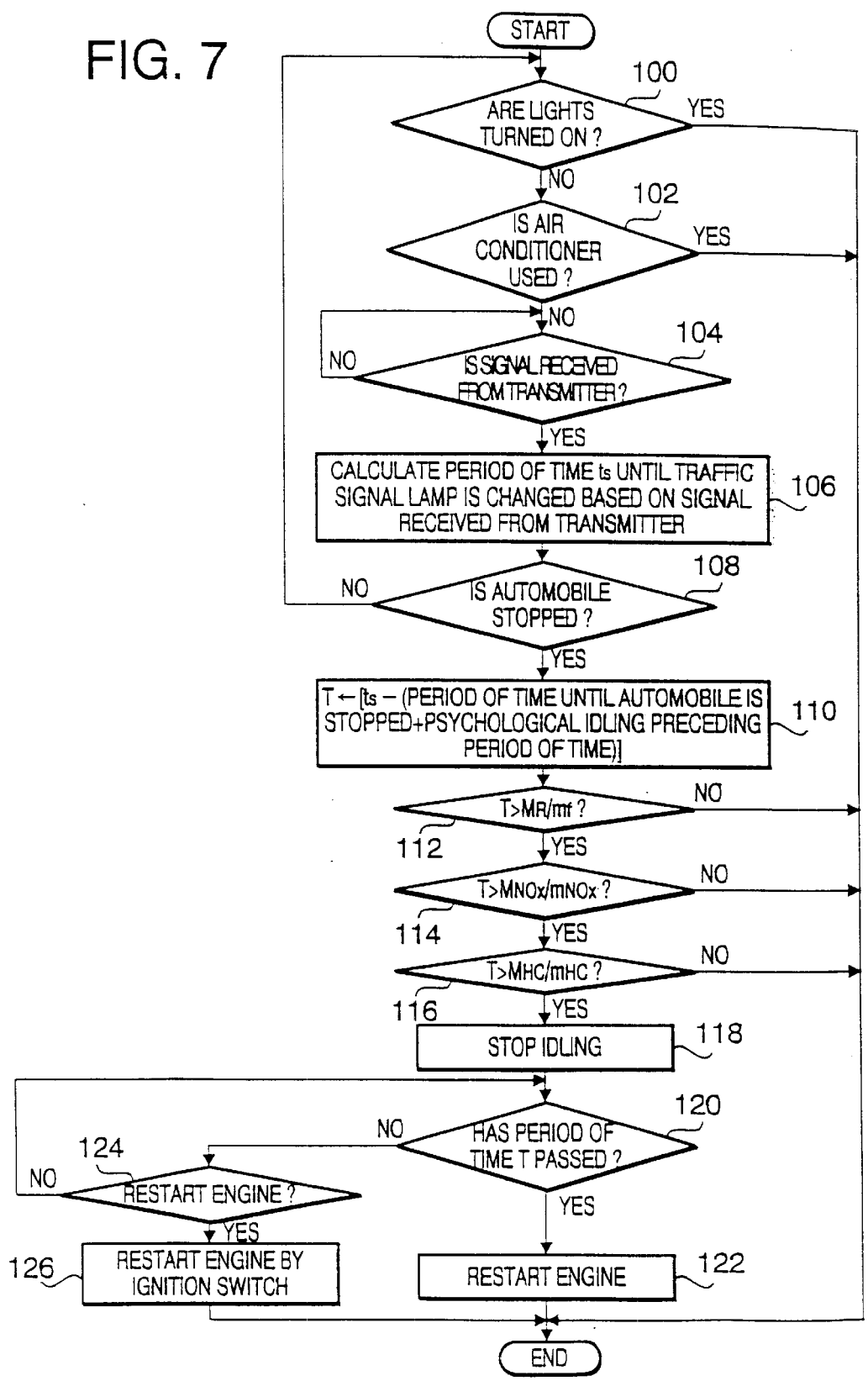
FIG. 7 is an example of flowchart showing the processing steps performed by the automobile engine idling stop system according to the embodiment of the present invention.

Subsequently, the operation of the embodiment will be described below with reference to the flowchart of FIG. 7.

First, it is judged whether the automobile 16 is in the state that the idling of the engine 42 can be stopped or not. In the embodiment, the controller 20 judges whether the lamps are turned on or not based on the signal supplied from the light switch 22 at step 100. When the judgment is YES, that is, the automobile is not in the state that the idling can be stopped, the idling is continued and the process is finished. Whereas, when the judgment is NO, the controller 20 determines whether the air conditioner 24 is used or not based on the signal supplied from the air conditioner 24 at subsequent step 102. When the determination is YES, that is, the automobile is not in the state to enable to stop the engine idling likewise the step 100, the idling is continued and the process is finished. Whereas, when the determination is NO, the process goes to subsequent step 104.

At step 104, it is determined whether the receiver 18 has received the modulated signal transmitted from the traffic signal device 12 as described above or not. When the determination is NO, step 104 is repeated until the signal transmitted from the traffic signal device 12 is received.

And, when the judgment at step 104 is YES, the process goes to subsequent step 106, and the period of time $t_S$ is calculated as described above based on the signal received from the traffic signal device 12.

At step 108, it is judged whether the automobile 16 is at rest or not. The judgment is carried out by checking whether the signal output from the automobile speed sensor 28 indicates 0 Km/h, whether the foot brake switch 30 is turned ON, whether the parking brake switch 26 is turned ON, and whether the neutral position detecting switch 32 is turned ON (at the neutral position). In the case that all the above judgment are affirmed, automobile is judged as at rest. Note that the judgment at step 108 is not limited to the above method, for example, any sole one or plural combination of the above checking items, i.e., the automobile speed sensor 28, the foot brake switch 30, the parking brake switch 26, and the neutral detecting switch may be used to judge a resting state of the automobile.

In the case that any one of the above items at step 108 is denied, steps 100 to 108 are repeated until the automobile is detected as in a rest state. In the case that the judgment at step 108 is affirmed YES, the process goes to subsequent step 110 and the period of time T (idling stop time) is calculated by subtracting the period of time until the automobile stops actually after receiving the signal and the psychological idling preceding time of period from $t_S$ which is calculated at step 106.

At step 112, the controller 20 determines whether the idling stop period of time T is effective or not from a viewpoint of fuel consumption. If the judgment is NO, that is, it is judged that fuel is much consumed by stop/restart of the engine, the idling is continued, and the process is finished. On the contrary, if the judgment is YES, the process goes to subsequent step 114.

At step 114, the controller 20 judges whether the idling stop period of time T is effective or not from a viewpoint of an amount of exhausted NOx. If the judgment is NO, it is judged that NOx is much discharged by stop/restart of the engine. The idling is continued, and the process is finished. On the contrary, if the judgment is YES, the process goes to subsequent step 116.

At step 116, the controller 20 judges whether the idling stop period of time T is effective or not from a viewpoint of exhausted HC which is increased when the idling is stopped and the engine is restarted. If the judgment is NO, that is, it is judged that HC is much exhausted by stop/restart of the engine restarted, then the idling is continued to steps 112 and 114, and the process is finished. On the contrary, if the judgment is YES, the process goes to subsequent step 118.

At step 118, the controller 20 controls ignition by the engine distributor 46 through the engine control unit 34, and stops the engine.

At step 120, the controller 20 judges whether the idling stop period of time T has passed or not after the idling is stopped. If the judgment is NO, the process goes to step 124 and it is judged whether the engine is to be restarted or not. Note that the judgment at step 124 is carried out based on whether the driver has actuated the ignition switch 44 (operation for starting the starter motor 40) or not. If the judgment at step 124 is NO, steps 120 and 124 are repeated until the determination at step 120 or 124 becomes YES.

If the judgment at step 124 is YES, it is judged that the engine has been restarted by the intention of the driver and the process goes to step 126 at which the starter motor 40 is started by the ignition switch 44 and the engine 42 is restarted, whereby a series of the processing steps are finished.

If the judgment at step 120 is YES, the process goes to step 122 at which the controller 20 rotates the starter motor 40 through the engine control unit 34 so as to restart the engine, whereby the series of the processing steps are finished.

Thus, the period of time $t_S$ until the traffic signal changes to green is calculated based on the signal from the traffic signal device 12 (steps 104 and 106) and it is judged whether the idling is to be stopped or not based on the calculated period of time $t_S$ until the traffic signal changes to green and the period of time until the idling stop effect is obtained (steps 110–118). Accordingly, the wasteful consumption of fuel and the discharge of harmful exhaust gases can be reduced by stopping the idling and restarting the engine 42 without any detrimental effects caused by the idling stop.

Further, since the engine is restarted before the idling stop period of time T passes, that is, before the traffic signal is changed to green (preceding by the idling preceding period of time), the engine can be restarted without giving any anxiety to the driver.

While the idling is stopped based on the signal transmitted from the traffic signal device 12 in the above embodiment, the present invention is not limited thereto. For example, the transmitter 14 of the embodiment may be mounted on a beacon for detecting traffic jam, or the like. This arrangement is effective when the automobile is compelled to wait for the traffic signal to change at a place apart therefrom due to a large traffic jam. And, when the automobile 16 is stopped not due to the traffic signal change to red but due to a traffic jam, a stop period of time of the automobile is calculated. And, by judging whether the calculated stop period of time is effective or not for the idling stop, the wasteful consumption of fuel and the discharge of harmful exhaust gases can be reduced without giving any anxiety to the driver.

In the above embodiment, when the lamps are turned on or when the air conditioner is used, it is judged that the automobile is not in the state to enable to stop idling, and the idling is continued. However, it may be possible to stop the idling after the present state of the automobile is stored and the lamps and the air conditioner are turned OFF and then to restore them to the original states when the engine 42 is restarted.

In the above embodiment, the control method of the idling stop (and restart) during the traffic signal changes from red to green has been explained. In the case that an arrow signal to indicate a go straight or turn left/right is used, the wasteful consumption of fuel and discharge of the harmful exhaust gas can be reduced without any anxiety of the driver, by using another frequency signal in the other frequency band and by detecting the state of the direction indicator, as similarly to the embodiment.

Implementation Form of the Invention: B

The hardware of an apparatus according to the present invention and the timing chart thereof will be described with reference to FIGS. 8 to 10 as another embodiment which substitutes for the embodiment described with reference to FIGS. 1 to 7.

Figure 8:
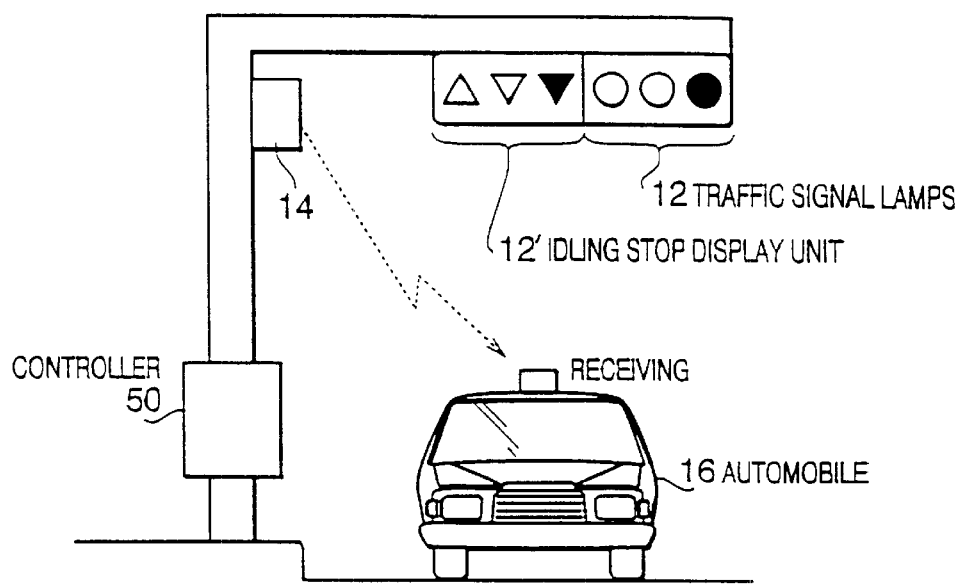
FIG. 8 is a view explaining the relationship between a traffic signal device and an automobile at an intersection in the automobile engine idling stop system according to the embodiment of the present invention.

FIG. 8 shows an example view to explain the relationship between a traffic signal indicator and an automobile 16 at an intersection according to the embodiment of the present invention for stopping the idling of an automobile engine at the intersection. The traffic signal indicator 12, idling stop (IS) signal lamp unit (signal display) 12' and a control signal transmitter 14 are installed at the intersection.

Figure 10:
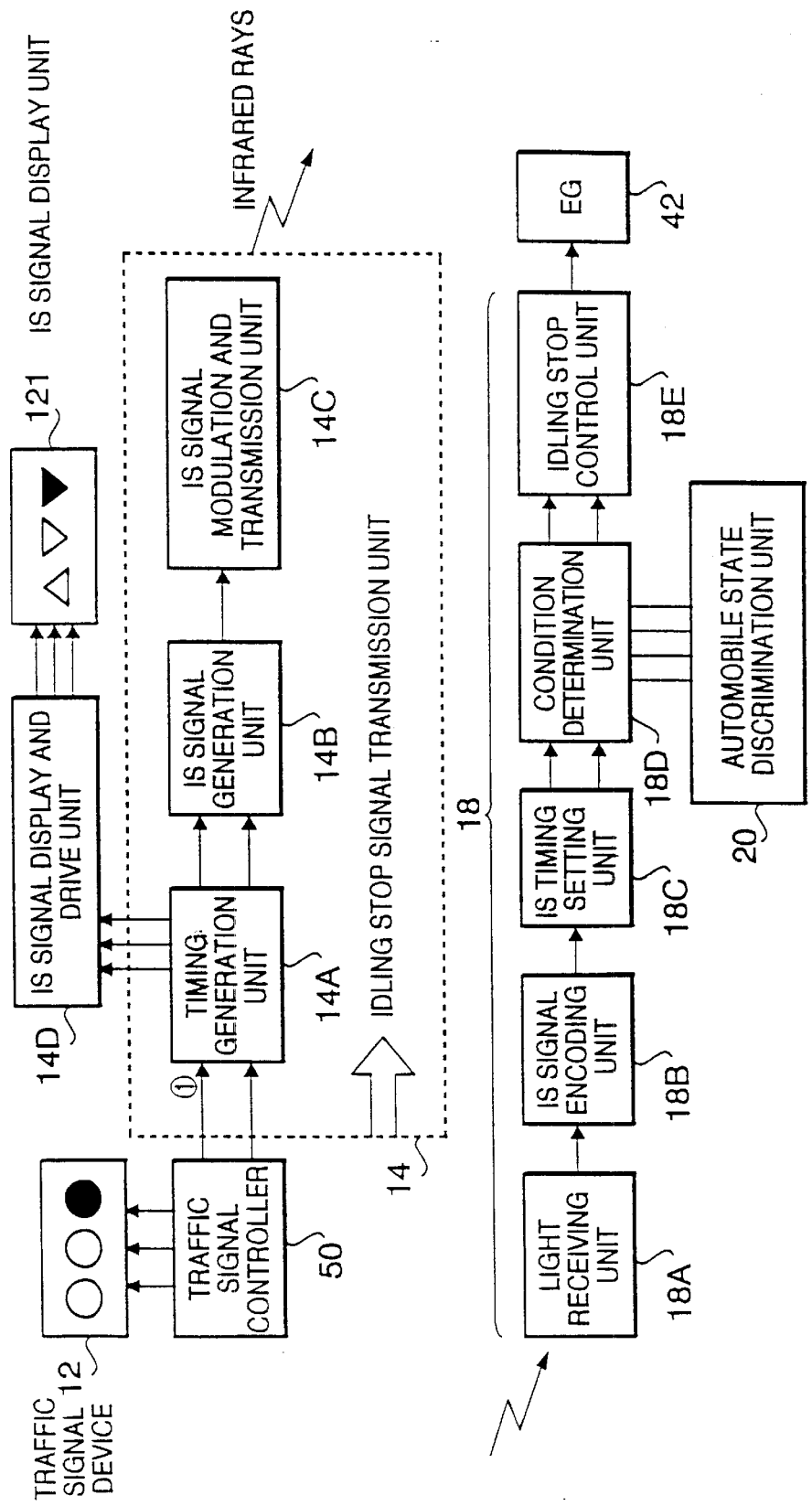
FIG. 10 is a block diagram showing the arrangements of a receiver and a transmitter.

The signal from the control signal transmitter 14 is transmitted to the receiver 18 of the automobile 16 which is shown in FIG. 10, by using infrared rays. The traffic signal indicator 12, the idling stop lamp unit 12' and the control signal transmitter 14 are connected to a traffic signal controller 50.

Figure 9:
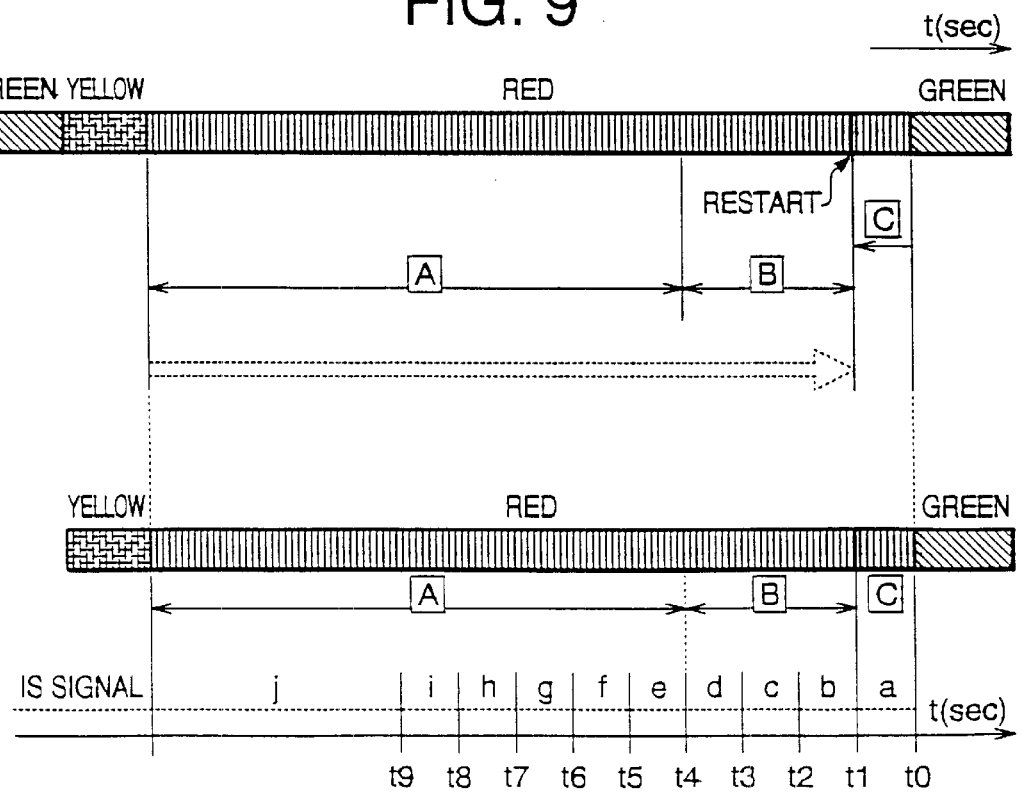

FIG. 9 is a schematic view to show the relation between the traffic signal indication and idling. FIG. 9 shows a sequential cycle of signal colors, green (G), yellow (Y), red (R), and green (G) along a time axis. The period of time of red (R) is further divided into periods of time of A, B and C in the upper view, and times $t_9$, $t_8$ . . . $t_1$ are shown in the lower view in relation to the turned-on period of time of the red (R). The period of time A shows a preferable time region of stop idling of the automobile which stops movement at a particular area such as the intersection. During the period of time B ($t_4$–$t_1$ in the example case of FIG. 9) the automobile keeps idling without interruption even though it stops movement, that is, the automobile 16 keeps an idling state as it is during the period of time B. Note that since the above periods of time vary depending upon the characteristics, type and the like of an automobile engine, these are set up to optimum values of the engine at the automobile side (on board apparatus of the automobile). FIG. 9 shows an example of an automobile which is set up B ($t_4$–$t_1$) as an optimum period of time of the engine. The period of time C is a psychological idling preceding period of time, and at time prior to green signal indication, the engine starts idling.

FIG. 10 is a block diagram showing the system configuration of a transmitter device 14 installed at a pedestrian crossing, an intersection or the like and a receiver device 18 mounted on an automobile. The transmitter device 14 as a signal transmitting section for transmitting a signal for stopping idling includes a timing generation unit 14A, an IS (idling stop) signal generation unit 14B and an IS signal modulation and transmission unit 14C.

The traffic signal controller 50 installed at the intersection or the like turns on the traffic signal lamps of the idling stop lamp unit 12' and generates a timing signal including $t_1$, $t_2$, to $t_9$. An IS signal display and drive unit 14D drives the idling stop lamp unit 12' by receiving the timing signal. The signal for indicating the idling stop of the engine is modulated by the IS signal modulation and transmission unit 14C and transmitted as an infrared signal or a radio wireless signal.

The receiver device 18 mounted on the automobile includes a receiver unit 18A, an IS signal encoding unit 18B, an IS timing unit 18C, a condition determination unit 18D and an idling stop controller 18E. An automobile state discrimination unit 20 discriminates various kinds of information as to the automobile and the like and sends the signal to the condition determination unit 18D. The engine mounted on the automobile 16 is controlled by the signal from the idling stop controller 18E.

Next, an embodiment of a signal display apparatus of this invention which gives the idling stop information to the driver will be explained hereunder in detail with reference to the drawings.

Figure 11:
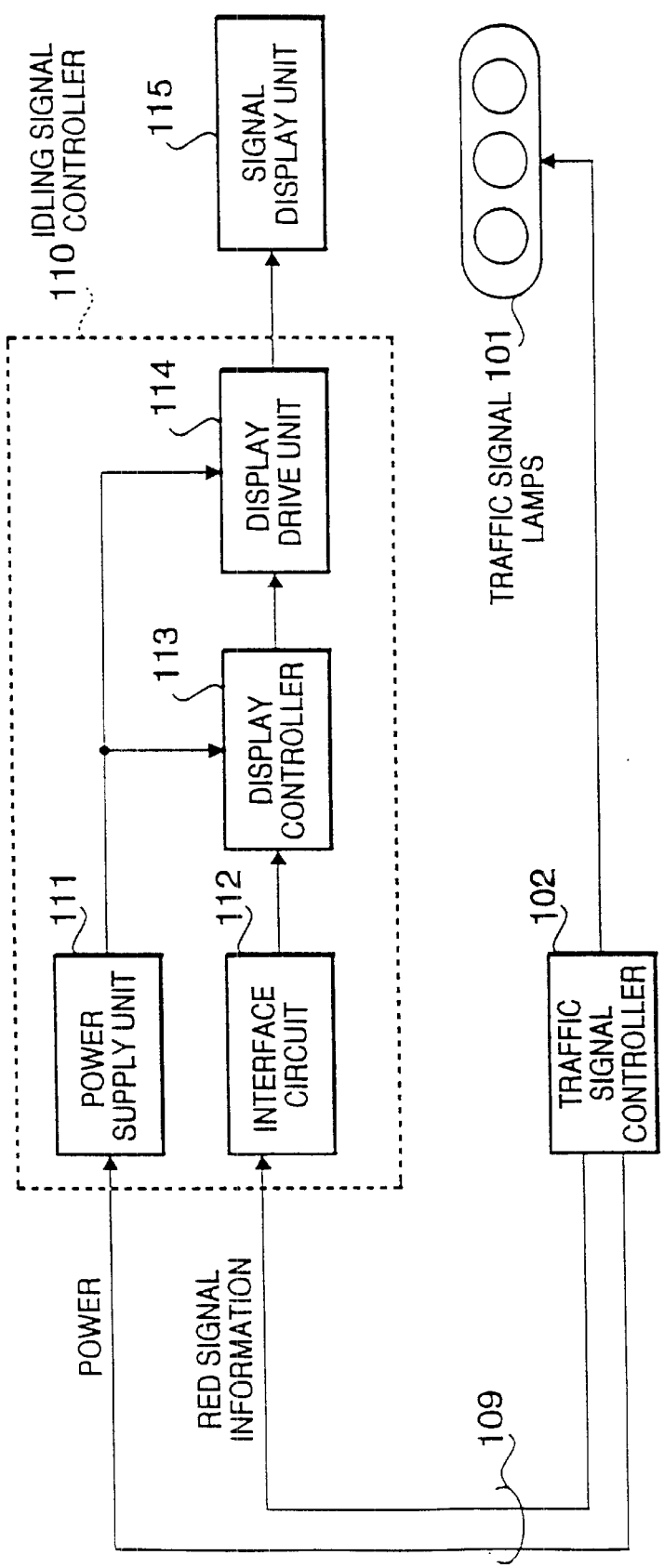
FIG. 11 is a system diagram showing the functions of the respective sections of an embodiment of a signal display apparatus for displaying information relating to the idling stop of the automobile engine according to the present invention.

FIG. 11 shows a block diagram explaining the functions of the respective components of the idling stop signal display apparatus.

Figure 12:
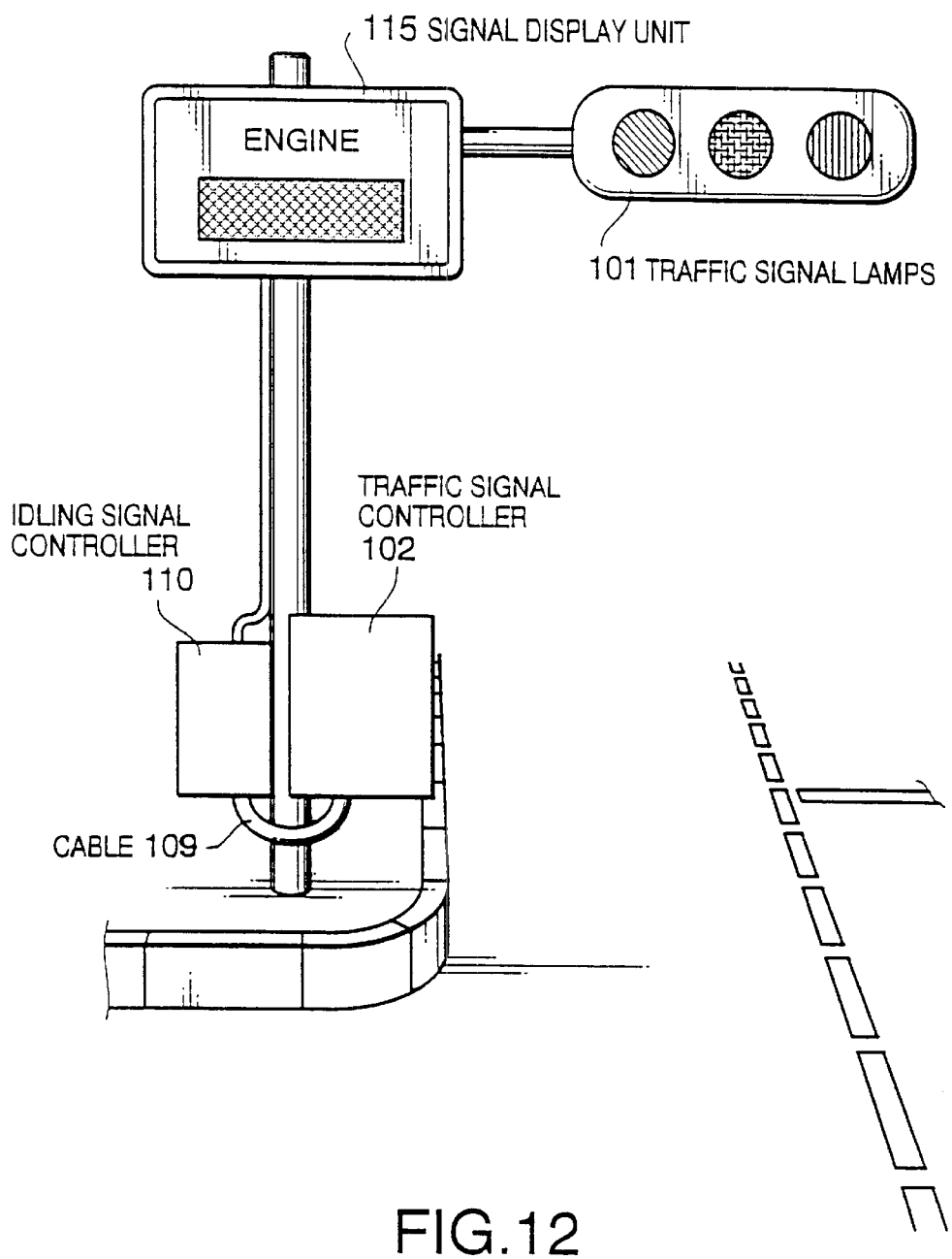
FIG. 12 is a view explaining an example showing how the signal display apparatus of FIG. 11 is installed.

FIG. 12 shows an example in which the apparatus of FIG. 11 is additionally mounted on a traffic signal device installed at an intersection.

In FIGS. 11 and 12, numeral 101 denotes the traffic signal of the traffic signal device and numeral 102 denotes a traffic signal controller for controlling the operation of the traffic signal 101. Numeral 115 denotes a display unit (hereinafter, called the signal display unit) for displaying indication whether the engine idling should be stopped or should be kept as it is when the automobile stops by the red signal at the intersection, and for displaying indication to inform restart timing of the engine to the automobile in idling stoppage. Numeral 110 denotes a controller (hereinafter, called an idling signal controller) for controlling the operation of the signal display unit 115.

The idling signal controller 110 is composed of a power supply unit 111, an interface. circuit 112, a display controller 113 and a display drive unit 114. The power supply unit 111 and the interface circuit 112 are connected to the traffic signal controller 102 through a cable 109. The power supply unit 111 supplies electric power to the display controller 113 and the display drive unit 114 and supplies the electric power to the signal display unit 115 through the display drive unit 114 too.

The display controller 113 receives red signal information from the traffic signal controller 102 through the interface circuit 112, controls the display drive unit 114 based on the information and changes the indication displayed on the signal display unit 115.

Figure 14:
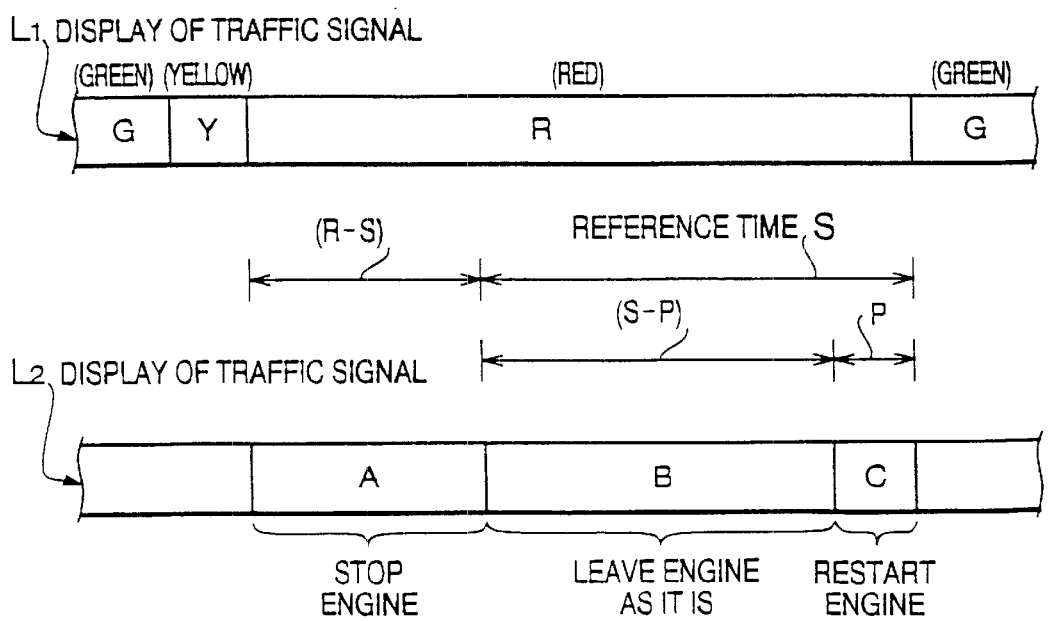
FIG. 14 is a view explaining the relationship between the contents of display for prompting the stop of the engine and the contents of display of traffic signal lamps.

FIG. 14 shows relation between display to prompt the driver to stop idling and a traffic signal display.

In FIG. 14, G, Y and R in the display $L_1$ show time zones of green, yellow and red signal respectively.

A, B and C of an idling signal display $L_2$ show time zones of indication of "stop engine", "leave engine as it is" and "restart engine" respectively.

Figure 13:
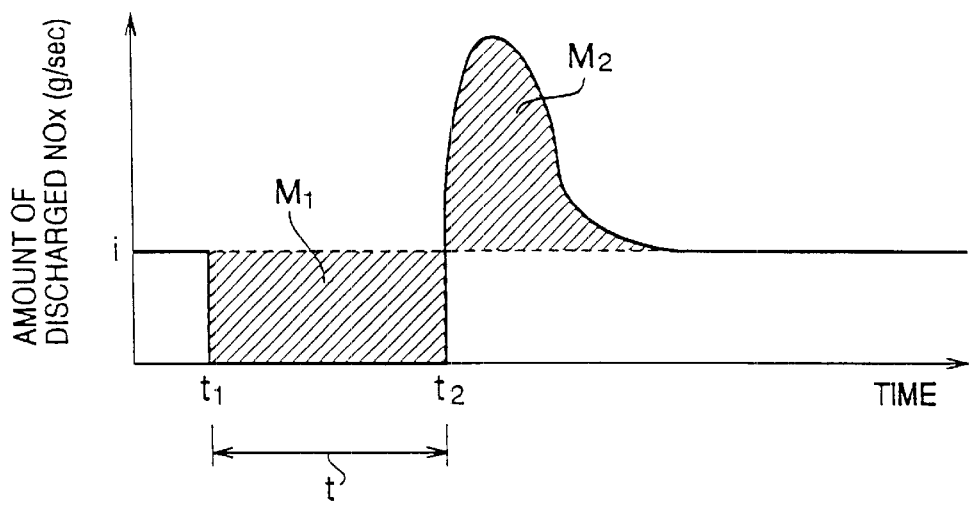
FIG. 13 is a graph showing the change of an amount of nitride oxide (NOx) discharged before and after the idling of the automobile engine is stopped.
Figure 15:
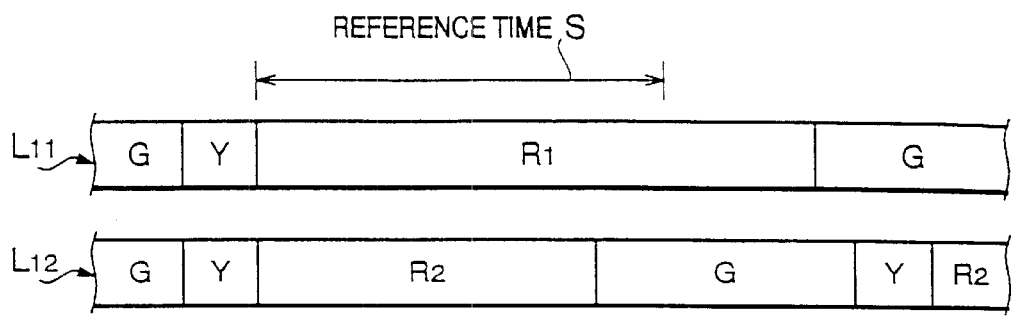
FIG. 15 is a view explaining a reference for determining whether an idling display is necessary or not.

In FIG. 15, S shows a reference period of time in which the area Ml is equal to the area $M_2$ in FIG. 13. Therefore, the period of time for indicating "stop engine" is equal to (R–S).

P is the psychological idling preceding period of time by which the driver can keeps his mind calm at starting the automobile. Therefore, the period of time to indicate "leave engine as it is", is set up to (S–P) which is obtained by subtracting the preset idling preceding period of time from the reference period of time S.

The display controller 113 judges whether the idling stop signal is to be displayed or not based on the input information of the preceding red signal and displays indication of "stop engine", "leave engine as it is" or "start engine" sequentially during the red signal based on the judgment.

FIG. 15 shows the traffic signal sequences to explain judgment criteria whether idling display operates or not. In case of $L_{11}$, since the period of time of a red signal $R_1$ is longer than the reference period of time S, the idling signal is displayed. And in case of $L_{12}$, since the period of time of a red signal $R_2$ is shorter than the reference period of time S, the idling signal may display "leave engine as it is" continuously during the period of the red signal or any idling display may not be performed.

Figure 16:
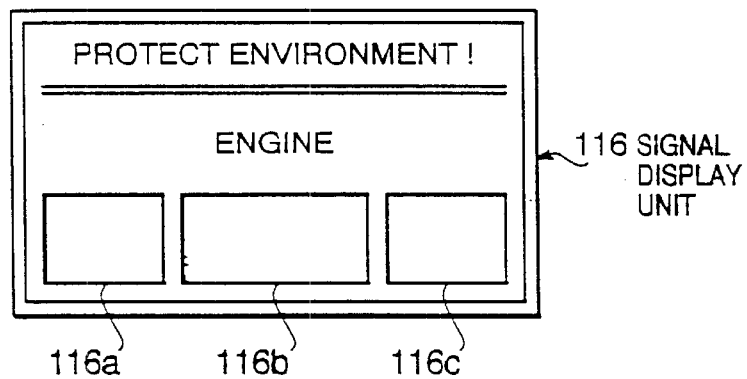
FIG. 16 is a front elevational view showing an example of a display surface corresponding to the display unit of FIG. 11.

FIG. 16 is an example of a front view showing the display of a signal display unit 116 which corresponds to the signal display unit 115 of FIG. 11 and FIG. 12. The signal display unit 116 displays sequentially "stop engine" 116a, "leave engine as it is" 116b and "restart engine" 116c. In this example, however, the term "engine" which is commonly used in the above three indications, is always displayed on the display and the terms "stop", "leave as it is" and "restart" are selectively illuminated at each time required.

Figure 17:
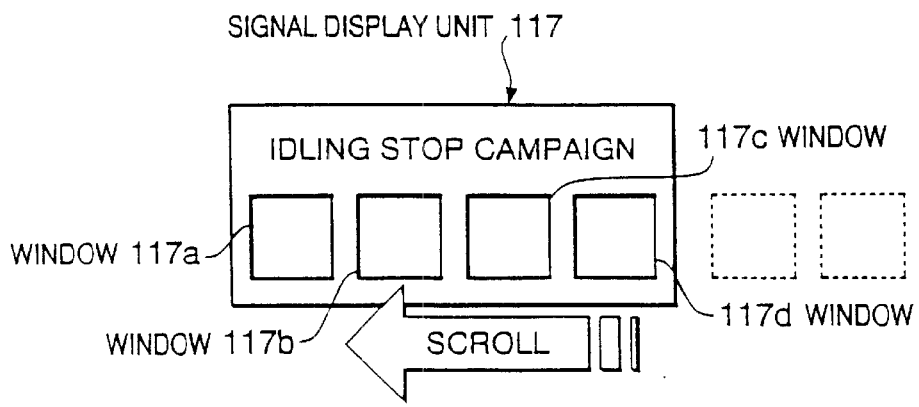
FIG. 17 is a front elevational view showing an example of another display surface corresponding to the display unit of FIG. 11.

FIG. 17 is a second example of front view showing the display of a signal display unit 117 which corresponds to the signal display unit 115 of FIG. 11 and FIG. 12. In this example, a plurality of windows 117a, 117b, 117c and 117d are formed on a display surface and the characters of "stop engine", "leave engine as it is" and "start engine" are repeatedly displayed in the windows by being scrolled one character by one character from right to left.

Figure 18:
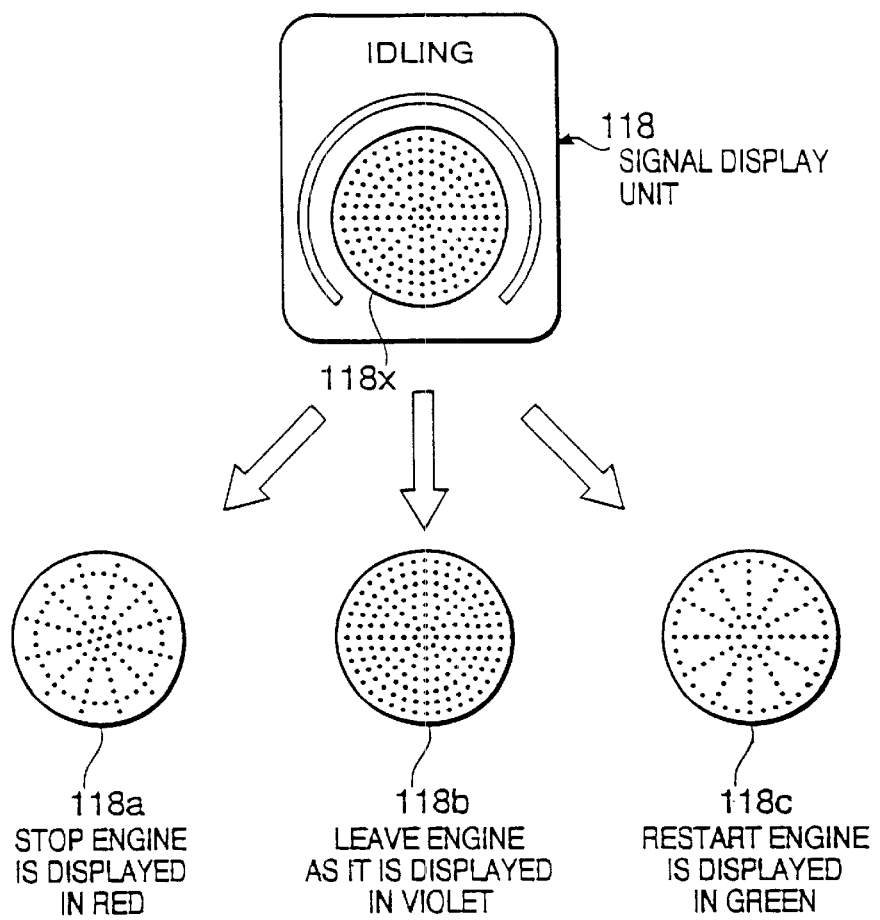
FIG. 18 is a front elevational view showing an example of still another display surface corresponding to the display unit of FIG. 11.

FIG. 18 is a third example of front view showing the display of a signal display unit 118 which corresponds to the signal display unit 15 of FIG. 11 and FIG. 12. In this example, "stop engine", "leave engine as it is" and "restart engine" are sequentially displayed by two groups of lamps which are composed of red LEDs and green LEDs.

For example, numeral 118a in FIG. 18 shows "stop engine" by the emission of the red light, numeral 118b shows "leave engine as it is" by violet color obtained by mixing the red light and green light, and numeral 118c shows "restart engine" by the green light.

Figure 19:
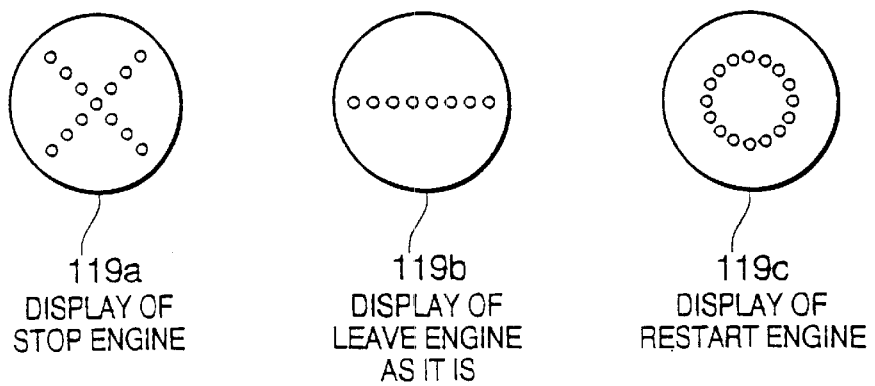
FIG. 19 is a front elevational view showing another display example of the display unit of FIG. 18.

In addition to the above, various kinds of the display methods are available. FIG. 19, for example, shows another display example of the display unit 118 of FIG. 18, wherein numeral 119a shows "stop engine", numeral 119b shows "leave engine as it is" and numeral 119c shows "restart engine".

FIG. 20 shows an example of a modified block diagram of the idling stop signal display apparatus shown in FIG. 11 and FIG. 12. The apparatus shown in FIG. 20 is used by connecting to a crossing gate controller installed at a railroad crossing and composed of an idling signal controller 120 and a signal display unit 125. The idling signal controller 120 is a controller for controlling operation of the signal display unit 125.

The idling signal controller 120 is composed of a power supply unit 121, an interface circuit 122, a display controller 123 and a display drive unit 124. The power supply unit 121 and the interface circuit 122 are connected to a railroad crossing gate control circuit box 103 by a cable 129.

The power supply unit 121 receives the electric power from the power supply unit 133 of the railroad crossing gate control circuit box 103 and supplies it to the display controller 123 and the display drive unit 124 and also supplies it to the signal display unit 125 through the display drive unit 124.

The interface circuit 122 receives information about the state of a railroad crossing gate arm and a train passing signal from the interface circuit 132 of the crossing gate control circuit box 103. Information about the state of the railroad crossing gate arm from a gate arm drive mechanism 130 and a train passing signal from a crossing gate control circuit 131 are sent to the display controller 123 through the interface circuits 122 and 132. The display controller 123 controls the display drive unit 124 based on the above input information and signal and changes the display contents of the signal display unit 125. That is, when the display controller 123 receives a gate arm lowering completion signal as the gate arm state information, it causes the signal display unit 125 to make a display for prompting "stop engine", and when the display controller 123 receives the train passing signal, the signal display unit 125 display "restart engine".

In the above case, the train is given priority of passing the length of the period of the railway crossroad and also the time length of being blocked by the gate arm cannot be presumed. Accordingly, the indications on the signal display unit 125 are limited to "stop engine" or "restart engine". Indication of "leave engine as it is" is not displayed. The specific structure of the display may be arranged similarly to those of FIG. 16–FIG. 19.

The structure and the form of the signal display unit of the idling stop signal display apparatus connected to the traffic signal device or to the crossing gate are able to be variously realized in addition to those shown in FIG. 16–FIG. 19. However, any of them is included in the scope of this invention as long as it satisfies the gist of this invention.

As described above, this invention is to prompt engine stop to the automobile in stoppage and to give information of engine restart timing to the automobile in stoppage.

And also this invention rouses the driver's effort to contribute the environment protection, and is useful to reduce the exhaust gas.

What is claimed is:

1. An automobile engine idling stop apparatus, comprising:
   receiver means for receiving a signal transmitted from roadside and indicated a period of time from a present time until a traffic signal changes;
   detection means for detecting the state of an automobile including the running condition thereof; and
   control means for controlling an idling stop based on the signal received by said receiver means and the state of the automobile detected by said detection means,
   wherein said control means stops the idling in the case that an amount of harmful exhaust gases reduced by such an idling stop exceeds an amount of harmful exhaust gases that are excessively discharged by engine restart.

2. An automobile engine idling stop apparatus according to claim 1, wherein said control means stops idling in the case that an amount of fuel that can be reduced by such an idling stop exceeds an amount of fuel consumed excessively by engine restart.

3. An automobile engine idling stop apparatus according to claim 1, wherein said control means restarts the automobile engine for a predetermined period of time prior to a change of an indication of the traffic signal.

4. An automobile engine idling stop apparatus according to claim 1, wherein said control means continues idling of the engine in the case that the state of the electrical components of the automobile, said electrical components including head lamps and an air conditioner, is detected as in operation by said detection means.

5. An automobile engine idling stop apparatus according to claim 1, wherein a frequency of the signal becomes a first frequency when the indication of the traffic signal is changed to a stop (red) signal and reaches a second frequency when the stop signal is changed to green, and wherein the frequency of the signal is continuously shifted from the first frequency to the second frequency over the period of the stop signal.

6. An automobile engine idling stop apparatus according to claim 1, further including:
   a transmitter disposed at roadside for transmitting a signal indicating a period of time from a present time until a traffic signal changes.

7. An automobile engine idling stop apparatus according to claim 6, wherein said transmitter is operated by the signal from a traffic signal device.

8. An automobile engine idling stop apparatus, comprising:
   receiver means for receiving a signal transmitted from roadside and indicated a period of time from a present time until a traffic signal changes;
   detection means for detecting the state of an automobile including the running condition thereof; and
   control means for controlling an idling stop based on the signal received by said receiver means and the state of the automobile detected by said detection means, wherein said control means stops the idling in the case that an amount of fuel that can be reduced by such an idling stop exceeds an amount of fuel consumed excessively by engine restart.

9. An automobile engine idling stop apparatus, comprising:

receiver means for receiving a signal transmitted from roadside and indicated a period of time from a present time until a traffic signal changes;

detection means for detecting the state of an automobile including the running condition thereof; and control means for controlling an idling stop based on the signal received by said receiver means and the state of the automobile detected by said detection means, wherein a frequency of the signal becomes a first frequency when the indication of the traffic signal is changed to a stop (red) signal and reaches a second frequency when the stop signal is changed to green, and wherein the frequency of the signal is continuously shifted from the first frequency to the second frequency over the period of the stop signal.

* * * * *